No. 867,439.
PATENTED OCT. 1, 1907.
J. STAEHLE.
FISHING TACKLE.
APPLICATION FILED JUNE 10, 1907.
Fig. 1
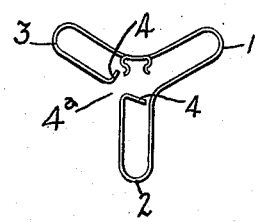
Fig. 2
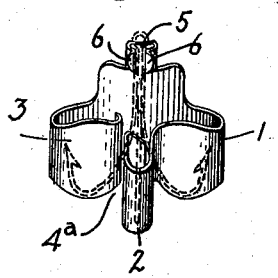
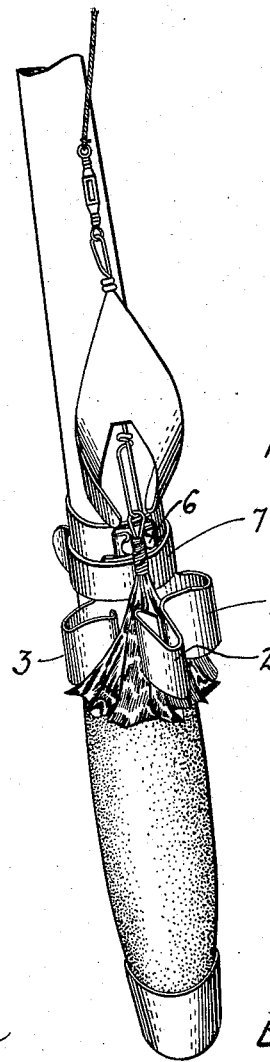
Fig. 3
Witnesses:
Margaret E. Woolley
Frank J. Doré
Inventor:
Joseph Staehle,
By B. B. Hine
Att'y.
THE NORRIS PETERS CO., WASHINGTON, D. C.

UNITED STATES PATENT OFFICE.

JOSEPH STAEHLE, OF SCHENECTADY, NEW YORK.

FISHING-TACKLE.

No. 867,439.      Specification of Letters Patent.      Patented Oct. 1, 1907.

Application filed June 10, 1907. Serial No. 378,150.

*To all whom it may concern:*

Be it known that I, JOSEPH STAEHLE, a citizen of the United States, residing at Schenectady, county of Schenectady, State of New York, have invented certain new and useful Improvements in Fishing-Tackle, of which the following is a specification.

My present invention aims to provide a device for conveniently and safely carrying fishing tackle and particularly fish hooks, and is especially adapted for securing and carrying a gang hook made by joining together two or more hooks.

The object of the invention is to provide a device that will conceal and inclose the points and barbs of the hooks so that they cannot become engaged or entangled with anything and which may be safely carried in the pocket or elsewhere without inconvenience; and in the same device provide means so that it cannot work loose and become detached from the carrier.

I prefer to make my carrier from blanks of metal of suitable size and shape, although other material may be used with good results.

Referring to the accompanying drawings, Figure 1 is a top plan view of the carrier; Fig. 2 is a view thereof in perspective; and Fig. 3 is a view of the carrier applied to a fishing rod with a gang hook or spoon hook secured therein.

For convenience I have shown my carrier arranged for a gang of three hooks, but it will be understood that it may be made to carry any desired number.

Referring to Fig. 2, 1, 2, 3 are loops or open-ended compartments adapted to receive and incase the points and barbs of the hooks. In the case of the compartments 2 and 3 the ends of the blank are bent inwardly at approximately a right angle to provide stops or bearing surfaces 4, 4 for the bend in the hooks, and also to provide an opening $4^a$ for the passage of the shank of the hook (see Fig. 1). A socket for the reception of the shank of the hook is provided at 5, and the shank is securely engaged by the spring clips 6—6 formed by bending up a portion of the blank, as shown.

To use my carrier the shank of the hook is passed into the opening at $4^a$, the points of the hooks inserted into the compartments 1, 2, 3 and drawn down until the bend in the hooks rests on the stops 4, 4, after which the shank or stem of the hook is forced into the socket 5 where it is securely held by the spring clips 6, 6.

In Fig. 3 I have shown my device applied to a fishing rod with a gang hook carrying artificial lures in the form of a fly and spoon secured thereon. The carrier is attached to the rod by a spring clip 7 which passes over the carrier and around the rod for a suitable distance.

What I claim as new and desire to secure by Letters Patent of the United States, is,—

1. As an article of manufacture, a device for holding fish hooks having one or more compartments for the reception and inclosure of the point and barb of the hooks, and spring clips for securing the shank of the hooks.

2. As an article of manufacture, a one-piece carrier for fish hooks having a plurality of open-ended compartments for incasing the point and barb of the hooks, one or more bearing surfaces for the hooks, and a spring clip socket for receiving and securing the shank of the hooks.

3. A one-piece holder for fishing tackle having one or more open-ended compartments for the reception and inclosure of the points and barbs of the hooks, said compartments being spaced to provide a passage for the shank of the hooks, and a socket for receiving the shank of the hook having bent portions which form spring clips for securing the shank in the socket.

4. A carrier for fish hooks having compartments for receiving and incasing the points and barbs of the hooks so spaced as to form a passage for the shank of the hooks, and a socket for receiving the shank of the hooks having spring clips which engage the shank and secure the hook in the carrier.

5. In combination, a fish pole or rod, a carrier for a fish hook detachably secured thereto, said carrier having compartments for receiving and inclosing the points and barbs of the hooks, and a spring clip socket for receiving and securing the shank of the hooks.

In witness whereof, I have hereunto set my hand this 7th day of June, 1907.

JOSEPH STAEHLE.

Witnesses:
    MARGARET E. WOOLLEY,
    J. ELLIS GLEN.